United States Patent [19]

Sato et al.

[11] Patent Number: 4,639,833

[45] Date of Patent: Jan. 27, 1987

[54] NEW ELECTRICAL INSULATING OIL AND OIL-FILLED ELECTRICAL APPLIANCES

[75] Inventors: Atsushi Sato, Tokyo; Keiji Endo, Yokosuka; Shigenobu Kawakami, Ichikawa; Hideyuki Dohi, Tokyo, all of Japan

[73] Assignee: Nippon Petrochemicals Company, Ltd., Japan

[21] Appl. No.: 764,873

[22] Filed: Aug. 12, 1985

[30] Foreign Application Priority Data

Aug. 18, 1984 [JP] Japan ................................. 59-172240

[51] Int. Cl.$^5$ .......................... H01G 4/22; H01B 3/22
[52] U.S. Cl. ................................ 361/315; 174/17 LF; 174/25 C; 252/570; 361/327; 585/6.3; 585/24; 585/25; 585/26
[58] Field of Search .................... 252/570; 174/17 LF, 174/25 C; 336/94; 361/327, 315; 585/6.3, 24, 25, 26

[56] References Cited

U.S. PATENT DOCUMENTS 3,925,221 12/1975 Eustance .............................. 252/579

FOREIGN PATENT DOCUMENTS

| 77898 | 6/1975 | Japan ................................. | 585/6.3 |
| 824878 | 12/1959 | United Kingdom .................. | 585/25 |
| 1579679 | 11/1980 | United Kingdom ................. | 585/6.3 |

Primary Examiner—Robert A. Wax
Attorney, Agent, or Firm—Scully, Scott, Murphy & Presser

[57] ABSTRACT

An improved electrical insulating oil and oil-filled electrical appliances impregnated therewith. The electrical insulating oil has a low viscosity, low pour point and other excellent electrical characteristics and it comprises an isomer mixture of dibenzylbenzenes in which the quantity of p-dibenzylbenzene is not more that 10% by weight and the weight ratio of m-dibenzylbenzene/o-dibenzylbenzene is not lower than 3.

7 Claims, No Drawings

NEW ELECTRICAL INSULATING OIL AND OIL-FILLED ELECTRICAL APPLIANCES

BACKGROUND OF THE INVENTION (1) Field of the Invention

This invention relates to an electrical insulating oil and oil-filled electrical appliances which is impregnated with the same.

More particularly, the invention relates to a new electrical insulating oil and oil-filled electrical appliances that are impregnated with the same, where the electrical insulating oil comprises a mixture of dibenzylbenzene isomers. The electrical insulating oil of the present invention is characterized in that both the viscosity and pour point thereof are low, the impregnating property to plastic materials as insulating or dielectric material is good, and it does neither dissolve nor swell the plastic materials.

(2) Description of the Prior Art

In the conventional art, the use of dibenzyltoluene as electrical insulating oil was proposed in Japanese Patent Publication No. 49-14320. However, any instance has never been known yet to those skilled in the art that dibenzylbenzene is used as an electrical insulating oil.

Meanwhile, in recent years, electrical appliances such as oil-filled capacitors have been made small in size, light in weight and durable to high voltages. With this tendency, various kinds of plastic materials have been used singly or together with the conventional insulating paper as insulating or dielectric materials.

The plastic materials will be still more used as the component materials of oil-filled electric capacitors. In some instances, all of the conventional insulating paper are replaced with plastic materials. As the electrical insulating oil used for the electrical appliances in which a plastic material is used, the insulating oil must have compatibility with the plastic material. In other words, when an electrical insulating oil comes into contact with a plastic material, if the oil dissolves or swells the plastic material, the dielectric strength of electrical appliances will be impaired. In the case that the viscosity of an electrical insulating oil is too high, the dielectric strength is also lowered owing to insufficient impregnation. Accordingly, it is necessary for the electrical insulating oil that it is well compatible with plastic materials and the viscosity of the insulating oil is sufficiently low.

Meanwhile, metallized film capacitors (hereinafter referred to as "MF capacitors") are known in the related technical field. In this MF capacitor, a metal-deposited film that is made by vacuum-depositing a metal such as aluminum or zinc is wound as an electrode. The MF capacitors of this kind are used widely because they have self healing action and can be made small in size with high dielectric strength even when they are not provided with any insulating film or paper interposed among layers of electrodes. Furthermore, biaxially stretched polypropylene film is widely used as the base film for these MF capacitors because it is inexpensive as compared with other films such as polyester film, in addition, the temperature characteristic in dielectric loss can be made good.

The MF capacitors presently used are mainly the so-called dry-type ones in which any electrically insulative impregnating agent such as insulating oil is not used.

Not only in electric capacitors but also in other various electrical appliances, the potential gradient can be generally made high when electrodes or electric conductors are wholly surrounded by an electrically insulative impregnatihg agent. That is, it is advantageous because the dielectric strength of electrical appliances can be improved. Furthermore, if an impregnating agent is properly selected, the high-voltage withstanding property can be improved moreover.

Accordingly, oil-impregnated or oil-filled MF capacitors are more preferable than dry-type capacitors. However, when a metal-deposited film with a polypropylene base film is impregnated with an electrically insulative impregnating agent, the sizes of the film are changed or the impregnating agent permeates through the boundary between the base film and the vacuum-deposited metallic layer. Accordingly, the metallic layer is cracked, and what is worse, the metallic layer peels off resulting into dielectric breakdown. In addition, as the capacitor is impregnated with an impregnating agent after the film is wound, if the selection of the impregnating agent is not adequately done, the impregnating agent cannot penetrate satisfactory into the clearances among film layers, from which aimed effect of impregnation cannot be expected.

In the dry-type capacitors, the dielectric breakdown is often liable to occur in the marginal edges or peripheries of wound metallic layers. So that, the dry-type MF capacitors is improved to some degree by modifying them into the so-called semi-dry MF capacitors, by impregnating the edge and peripheral portions with an impregnating agent with leaving internal portions unimpregnated.

There is, however, a limit in the improvement effect in the semi-dry MF capacitors of the above type because it is impregnated only partially and most portions of electrode layers are left unimpregnated, and it may not be denied that the semi-dry MF capacitors are not satisfactory as compared with fully impregnated types. Accordingly, various MF capacitors of impregnated type have been proposed.

For example, proposed in Japanese Laid-Open Patent Publication No. 55-36972 is a impregnated MF capacitor in which the expansion rate of metallized film that is swollen by an impregnating agent is made 0.5% or less. In British Pat. No. 1,451,499, an oil-filled capacitor is disclosed in which the percentage of change in length of polypropylene film owing to an insulating oil is not more than 0.5% at 80° C. and the diffusion quantity of the insulating oil into the polypropylene film is not more than 10% at 100° C., and this capacitor can be an MF capacitor.

However, the above-described MF capacitors do not always fit for practical uses.

BRIEF SUMMARY OF THE INVENTION

In view of the above-described conventional state of the art, it is the primary object of the present invention to provide a new and improved electrical insulating oil and oil-filled electrical appliances impregnated with the same, which oil and appliances are free from the foregoing disadvantages in the conventional art.

Another object of the present invention is to provide an electrical insulating oil comprising a specific isomer mixture of dibenzylbenzenes and having practically advantageous characteristics.

A further object of the present invention is to provide an electrical insulating oil which is quite suitable for use in impregnating oil-filled capacitors, especially MF capacitors in which at least a part of their insulating or dielectric material is made of plastics.

According to the present invention, the electrical insulating oil comprises an isomer mixture of dibenzylbenzenes in which p-dibenzylbenzene is not more than 10% by weight and the weight ratio of m-dibenzylbenzene/o-dibenzylbenzene is not lower than 3.

DETAILED DESCRIPTION OF THE INVENTION

In a method proposed in the prior art for synthesizing dibenzylbenzene; benzyl chloride, $\alpha,\alpha'$-dichloroxylene or dichloromethane is reacted with benzene in the presence of a Friedel-Crafts catalyst such as aluminum chloride. In another known method, diphenylmethane is reacted with benzyl chloride. Furthermore, it is possible to synthesize it by disproportionating diphenylmethane in the presence of a disproportionation catalyst such as aluminum chloride.

The dibenzylbenzene obtained by any of the above method is inevitably a mixture of three position isomers of o-, m- and p-dibenzylbenzenes. Among them, p-isomer, i.e. p-dibenzylbenzene is liable to crystallize. As electrical insulating oils are often used at lower temperatures, if any solid particles deposit in the insulating oil, it is not desirable because insufficient impregnation will occur.

In order to obtain an electrical insulating oil which is free from the deposition of solid component and which can be used even in lower temperature conditions, the inventors have carried out extensive study on various isomer mixture of dibenzylbenzene. As a result, it has been understood that any solid component does not deposit under low temperature conditions if the quantity of p-dibenzylbenzene is not more than 10% by weight, preferably less that 5% by weight, and such a isomer mixture can be advantageously used in practice as an electrical insulating oil, thereby accomplishing the present invention.

The ratio between other isomers, m-dibenzylbenzene to o-dibenzylbenzene in the dibenzylbenzene isomer mixture may be so determined that the deposition of solid component is suppressed, the viscosity is low and pour point is also low. For this purpose, the weight ratio of m-dibenzylbenzene/o-dibenzylbenzene may be not lower than 3, and preferably higher than 5. The upper limit of this ratio does not exist particularly, which will be determined according to production costs, easiness in preparation and other factors.

In dibenzylbenzene prepared by the above-mentioned conventional methods generally contains more than 10% by weight of p-dibenzylbenzene. Accordingly, the content of p-dibenzylbenzene must be reduced. In order to reduce the content of p-dibenzylbenzene to 10% by weight or less, it is possible to deposit and separate it by low-temperature processing. In another method, p-dibenzylbenzene is removed by adsorption using a molecular sieve, for example, synthetic zeolites that are typically exemplified by ZSM-5 types such as ZSM-5 and ZSM-11.

When dibenzylbenzene is prepared by the foregoing method, a mixture of three isomers is generally obtained. The ratio of the three isomers depends upon theoretical equilibrium composition. In practice, several compositions which largely deviate from the theoretical equilibrium composition are obtained according to the kind of catalyst used and other reaction conditions. For example, when ZSM-5 type synthetic zeolite is used as an alkylation catalyst or disproportionation catalyst, p-dibenzylbenzene is produced much. The excess quantity of this p-dibenzylbenzene can be adjusted by the above-mentioned treating method. However, the adjusting of the ratio of m-dibenzylbenzene to o-dibenzylbenzene by the above method or even by distillation, is difficult. Accordingly, it is advisable that the ratio of these substances may be adjusted by properly selecting the catalyst and conditions in synthesis.

When an electrical insulating oil is prepared by an intended specific reaction to produce only or mainly the m-isomer, the production cost cannot help becoming high. However, the above inexpensive conventional method will inevitably produces the isomer mixture. It is, therefore, the present invention provides an improved electrical insulating oil which can be obtained at lower cost and has excellent electrical properties, by specifying the ratio of o-, m- and p-isomers of dibenzylbenzene.

The electrical insulating oil of the invention is quite excellent because it has a lower viscosity and lower pour point as compared with the conventionally known electrical insulating oil such as dibenzyltoluene.

Furthermore, the electrical insulating oil of the present invention is suitable for use in impregnation of oil-filled capacitors in which at least a part of their dielectrics are made of plastics, because the insulating oil is compatible with plastic materials and it does not swell the materials.

The oil-filled capacitor is made by winding a metal foil such as aluminum foil as an electrode and a plastic film together to obtain a capacitor element and by impregnating it with an electrical insulating oil through a conventional method. As the materials for plastic films, there are polyolefins such as polyethylene, polypropylene and polymethylpentene, polyesters and polyvinylidene fluoride. Among them, the polyolefins are preferable and polypropylene is more preferable. Furthermore, the above plastic films can be used together with the conventionally used insulating paper.

Among oil-filled capacitors, especially desirable capacitors to be impregnated with the electrical insulating oil of the invention are the above-mentioned MF capacitors in which the electrode is formed of a metallized plastic film that is made by vacuum-depositing a metal such as aluminum or zinc on a plastic film. The MF capacitor is made by winding a metallized plastic film and then it is impregnated with an electrical insulating oil according to the conventional method. As described above, films made of polyolefins such as polyethylene, polypropylene and polymethylpentene are preferable, and among them, polypropylene is more preferable.

The dibenzylbenzene isomer mixture according to the present invention itself can be used as an electrical insulating oil, however, it is of course possible to use by mixing the isomer mixture with one or more kinds of known electrical insulating oils. Accordingly, it should be noted that the term "electrical insulating oil comprising a mixture of dibenzylbenzene isomers" includes both "electrical insulating oil consisting of a mixture of dibenzylbenzene isomers" and "electrical insulating oil containing a mixture of dibenzylbenzene isomers". That is, the latter covers "electrical insulating oil of a mixture of the dibenzylbenzene isomer mixture and other known electrical insulating oil or oils".

The known electrical insulating oils which can be used together with the dibenzylbenzene isomer mixture of the invention are exemplified by refined mineral oils, olefin oligomers such as polybutene, alkylbenzenes such as dodecylbenzene, di- or triarylalkanes such as diphenylmethane, triphenylethane and phenylxylylethane, alkylbiphenyls such as monoisopropylbiphenyl, alkylnaphthalenes such as diisopropylnaphthalene, triarylalkanes or triaryldialkanes such as dibenzyltoluene, distyrenated xylene and saturated trimer of styrene, phthalic esters such as DOP, and animal or vegetable oils such as castor oil.

As described in the foregoing paragraph, the electrical insulating oil of the present invention is not a simple mixture of dibenzylbenzene isomers but a mixture of the specific composition described above. Owing to this specific composition, both the viscosity and pour point of the electrical insulating oil could be made low and it can be easily and effectively impregnated into electrical appliances. Furthermore, the electrical insulating oil of the invention scarcely swells or dissolves plastic materials. Accordingly, capacitors of high performance can be produced by using the electrical insulating oil of the invention. In addition, as described later, the electrical insulating oil of the invention has excellent electrical characteristics which means that it is quite suitable and advantageous for impregnating the electrical appliances of this kind.

In the following, the present invention will be described in more detail with reference to examples.

EXAMPLE (Synthesis of Dibenzylbenzene Isomer Mixture)

To a reaction vessel were added 2500 g of diphenylmethane and 40 g of aluminum chloride and reaction was carried out for 2 hours at room temperature with further adding 600 g of benzyl chloride with stirring. After the reaction, the catalyst was deactivated and 1300 g of a dibenzylbenzene isomer mixture (Composition I) was obtained by reduced pressure distillation.

The above Composition I was left to stand still at 10° C. for 24 hours. It was observed that a solid component mainly consisting of p-dibenzylbenzene was deposited which was filtered off to obtain a filtrate of Composition II.

The Composition II was then passed through a synthetic zeolite (ZSM-5) column at 150° C., where p-dibenzylbenzene was selectively adsorbed and removed by ZSM-5, thus a dibenzylbenzene isomer mixture (Composition III) was recovered.

The compositions of the above Compositions I, II and III (electrical insulating oil of the invention) are shown in the following Table 1. The properties of this Composition III were as follows:

Pour point: −42.5° C.
Viscosity: 9.0 cSt (at 40° C.)
Dielectric breakdown voltage: 70 kV/2.5 mm or above
Dielectric loss tangent (tan δ): 0.01% (at 80° C.)
Specific volume resistivity ($\rho$): $5.3 \times 10^{15}$ Ω·cm (at 80° C.)
Dielectric constant ($\epsilon$): 2.55

TABLE 1

| Composition | Ratios of Isomers (% by weight) | | | Deposition[1] Point (°C.) |
|---|---|---|---|---|
| | o-Isomer | m-Isomer | p-Isomer | |
| Comp. I[2] | 10.2 | 52.1 | 34.2 | +30 |
| Comp. II | 14.4 | 73.9 | 11.7 | +12 |
| Comp. III | 15.6 | 80.1 | 4.3 | −30[3] |
| Comp. IV | 25.7 | 70.0 | 4.3 | +3 |

Notes:
[1]Temperatures were lowered at intervals of 3° C. and the compositions were left to stand for 24 hours at each temperature. The indicated temperature is the one at which solid component (p-dibenzylbenzene) deposited.
[2]Comp. = Composition
[3]No deposition was observed.

(Formation of Capacitors and Its evaluation)

Aluminum was deposited on one side surface of a capacitor-use stretched polypropylene films by a usual method to obtain a 40 mm wide metal-vacuum-deposited film with 3 mm margins. Capacitor elements were made by winding this metal-deposited film and they were impregnated with the above Composition III by an ordinary method at 80° C. to obtain MF capacitors of 5 μF in electrostatic capacity.

This capacitors were then applied with a constant electric voltage at 80° C., 30° C. and 0° C. to determine the time lengths (hours) when half the number of capacitors were broken down. The results of this test are shown in the following Table 2.

For reference purpose, with regard to the above film, the ratio of change in length at 80° C. and the diffusion quantity into the film at 100° C. were determined according to the method described in the foregoing British Pat. No 1,451,499. The ratio of change in length was 1.6% and the diffusion quantity was −3.3% by weight.

For comparison purpose, other MF capacitors were made by impregnating with the dibenzylbenzene isomer mixture of Composition I and breakdown times at 80° C. and 30° C. were determined. The results are also known in Table 2.

Furthermore, the dibenzylbenzene isomer mixture of Composition IV (m/o=2.7) as shown in Table 1 was prepared and MF capacitors were made likewise impregnating with the same Composition IV. The breakdown times were also determined and the results are shown in Table 2.

TABLE 2

| Impregnating Oil Comp. | Determined Temp. (°C.) | Potential Gradient (V/μ) | | | | | |
|---|---|---|---|---|---|---|---|
| | | 90 | 100 | 110 | 120 | 130 | 140 |
| Comp. III | 80 | O | O | 250 | 85 | 23 | X |
| | 30 | O | O | 345 | 122 | 86 | X |
| | 0 | O | O | 283 | 100 | 51 | X |
| Comp. I | 80 | O | O | 243 | 52 | 31 | X |
| | 30 | X | X | X | X | X | X |
| Comp. IV | 80 | O | O | 200 | 55 | 34 | X |
| | 30 | O | 303 | 95 | 12 | X | X |
| | 0 | X | X | X | X | X | X |

Notes:
O: Not broken down after 500 hours' test.
X: Broken down within 1 hour.

As will be understood from the above results, the breakdown times of the MP capacitors which were impregnated with the dibenzylbenzene isomer mixture containing more than 10% by weight of p-dibenzylbenzene, were very short owing to the deposition of p-dibenzylbenzene. Furthermore, even though the electrical insulating oil of the present invention does not come within the scope of the invention as described in British Pat. No. 1,451,499, the performance as capacitors is quite excellent.

What is claimed is:

1. An electrical insulating oil which comprises an isomer mixture of dibenzylbenzenes in which the quantity of p-dibenzylbenzene is not more than 10% by weight and the weight ratio of m-dibenzylbenzene/o-dibenzylbenzene is not lower than 3.

2. The electrical insulating oil in claim 1, wherein the quantity of said p-dibenzylbenzene is not more than 5% by weight and the weight ratio of m-dibenzylbenzene/o-dibenzylbenzene is not lower than 5.

3. An oil-filled electrical appliance which is characterized in that at least a part of its electrical insulating material or dielectric material is made of a plastic material and is impregnated with an electrical insulating oil which comprises an isomer mixture of dibenzylbenzenes where the quantity of p-dibenzylbenzene is not more than 10% by weight and the weight ratio of m-dibenzylbenzene/o-dibenzylbenzene is not lower than 3.

4. The oil-filled electrical appliance in claim 3, wherein said oil-filled electrical appliance is an oil-filled capacitor.

5. The oil-filled electrical appliance in claim 4, wherein said oil-filled capacitor is made by winding a metallized plastic film.

6. The oil-filled electrical appliance in claim 3, wherein said plastic material is polyolefin.

7. The oil-filled electrical appliance in claim 6, wherein said polyolefin is polypropylene.

* * * * *